(12) United States Patent
Ichioka et al.

(10) Patent No.: US 8,554,400 B2
(45) Date of Patent: Oct. 8, 2013

(54) CONTROL APPARATUS FOR HYBRID VEHICLE

(75) Inventors: Eiji Ichioka, Toyota (JP); Takemi Tamura, Kota-cho (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/319,904

(22) PCT Filed: May 12, 2009

(86) PCT No.: PCT/JP2009/058868
§ 371 (c)(1),
(2), (4) Date: Jan. 6, 2012

(87) PCT Pub. No.: WO2010/131334
PCT Pub. Date: Nov. 18, 2010

(65) Prior Publication Data
US 2012/0101676 A1 Apr. 26, 2012

(51) Int. Cl.
*B60W 20/00* (2006.01)
(52) U.S. Cl.
USPC .................................. 701/22; 318/139; 477/3
(58) Field of Classification Search
USPC .................................. 701/22; 318/139; 477/3
See application file for complete search history.

(56) References Cited

U.S. PATENT DOCUMENTS

| | | | |
|---|---|---|---|
| 7,832,512 B2 | 11/2010 | Watanabe et al. | |
| 8,313,413 B2 | 11/2012 | Nomasa et al. | |
| 2004/0108149 A1 | 6/2004 | Adachi et al. | |
| 2008/0234915 A1* | 9/2008 | Nomasa et al. | ................ 701/102 |
| 2010/0106351 A1 | 4/2010 | Hanssen et al. | |

FOREIGN PATENT DOCUMENTS

| | | |
|---|---|---|
| JP | 2002 349405 | 12/2002 |
| JP | 2003-063258 | 3/2003 |
| JP | 2004 100580 | 4/2004 |
| JP | 2006-226381 | 8/2006 |
| JP | 2007 216764 | 8/2007 |
| JP | 2007 223442 | 9/2007 |
| JP | 2008 238837 | 10/2008 |
| JP | 2008 296698 | 12/2008 |

OTHER PUBLICATIONS

International Search Report Issued Aug. 18, 2009 in PCT/JP09/058868 filed May 12, 2009.
Office Action mailed Mar. 29, 2012, in co-pending U.S. Appl. No. 12/053,837 (U.S. Patent No. 8,313,413).
Noticed of Allowance mailed Jul. 16, 2012, in co-pending U.S. Appl. No. 12/053,837 (U.S. Patent No. 8,313,413).

* cited by examiner

*Primary Examiner* — Mary Cheung
*Assistant Examiner* — Brian P Sweeney
(74) *Attorney, Agent, or Firm* — Oblon, Spivak, McClelland, Maier & Neustadt, L.L.P.

(57) ABSTRACT

A control apparatus for a hybrid vehicle to permit charging of an electric-energy storage device with an electric energy supplied from an external electric power source provided outside said hybrid vehicle, while said hybrid vehicle is held stationary; and to operate an engine for operating a lubricant supply device to supply a predetermined amount of the lubricant, during charging of said electric-energy storage device by said external electric power source, irrespective of whether a count of said motor running counter has reached a predetermined upper limit, and to reset said motor running counter.

6 Claims, 6 Drawing Sheets

CONTROL APPARATUS FOR HYBRID VEHICLE

TECHNICAL FIELD

The present invention relates to a control apparatus for a hybrid vehicle provided with an engine and an electric motor serving as a vehicle drive power source, and more particularly to a supply of a lubricant to a power transmitting system provided to transmit a vehicle drive force from the vehicle drive power source to drive wheels.

BACKGROUND ART

There is known a control apparatus for a hybrid vehicle provided with an engine and electric motors serving as a vehicle drive power source, a power transmitting system for transmitting a drive force of the vehicle drive power source to a drive wheel, and an electric-energy storage device for supplying a stored electric energy to the electric motor. Patent documents 1, 2 and 3 disclose examples of such a hybrid vehicle control apparatus. The hybrid vehicles disclosed in these documents are provided with a power transmitting system including a planetary gear set which has a first element connected to the engine, a second element connected to a first electric motor, and a third element connected to an output rotary member and a second electric motor. The planetary gear set is configured to distribute an output of the engine to the first electric motor and the output rotary member. These hybrid vehicles are able to run in a motor drive mode in which only the second electric motor is operated as the vehicle drive power source, while the engine is held at rest. Generally, the hybrid vehicles as described above are provided with a mechanically operated oil pump operatively connected to the engine and constructed to deliver a working oil according to an operation of the engine, so that the oil pump operated while the engine is operated supplies a lubricant to the above-described planetary gear set and other parts (such as gears and bearings) of the power transmitting system.

The oil pump connected to the engine is not operated in the motor drive mode in which the engine is held at rest, so that the lubricant is not supplied as needed to the predetermined parts of the above-described power transmitting system in the motor drive mode, giving rise to a risk of deterioration of durability of the predetermined parts (such as the gears and other rotating members) of the power transmitting system, due to metal contacts of the parts, etc. In particular, a so-called "plug-in hybrid vehicle" the electric-energy storage device of which is chargeable with an electric energy supplied from an external electric power13ource for the hybrid vehicle such as a domestic power source is considered to be able to have comparatively long running time and distance in the motor drive mode, and consequently has a high risk of the above-described problem caused by the long running in the motor drive mode in which the lubricant is not supplied with the engine held at rest. To deal with this problem, the above-described Patent document 1 proposes a forced operation of the engine (engine motoring) by the first electric motor to operate the oil pump to supply the lubricant to predetermined parts of the engine, when a time period of resting of the engine exceeds a predetermined upper limit.

PRIOR ART DOCUMENTS

Patent Documents

Patent Document 1: JP-2007-216764 A
Patent Document 2: JP-2002-349405 A
Patent Document 3: JP-2008-296698 A

SUMMARY OF THE INVENTION

Object Achieved by the Invention

However, the forced operation of the engine by the first electric motor for lubrication causes deterioration of the charged state (reduction of the stored electric energy amount) of the electric-energy storage device used to supply the electric energy to the second electric motor, for example, causing a risk of reduction of the running distance and time in the motor drive mode, and resulting in an earlier operation of the engine, leading to reduction of energy efficiency of the vehicle, for instance, reduction of fuel economy of the vehicle. It is also noted that the forced operation of the engine in the motor drive mode means an operation of the engine irrespective of the vehicle running by the second electric motor, giving rise to a risk of giving the user of the vehicle a sense of anxiety. Thus, the forced operation of the engine may reduce advantages of the plug-in hybrid vehicle in the motor drive mode. It is noted here that the problem described above is not recognized in the art.

The present invention was made in view of the background art described above. It is therefore an object of the present invention to provide a control apparatus for a hybrid vehicle, which permits an improved fuel economy of the hybrid vehicle while permitting an adequate supply of a lubricant from a lubricant supply device to at least a portion of a power transmitting system.

Means for Achieving the Object

The object indicated above is achieved according to the present invention, which provides a control apparatus for (a) a hybrid vehicle provided with an engine and an electric motor serving as a vehicle drive power source, a power transmitting system for transmitting a drive force of the vehicle drive power source to a drive wheel, an electric-energy storage device for storing an electric energy to be supplied to the above-described electric motor, and a lubricant supply device which is operatively connected to the above-described engine and operated by a rotary motion of the engine to supply a lubricant to at least a portion of the above-described power transmitting system, (b) characterized in that the control apparatus is configured: to permit running of the hybrid vehicle in a motor drive mode in which only the above-described electric motor is operated as the vehicle drive power source, with the electric energy supplied from the electric-energy storage device while the rotary motion of the above-described engine is stopped; (c) to operate a motor running counter in the above-described motor drive mode, to count continuation of the motor drive mode without the rotary motion of the above-described engine, and to operate the above-described engine for operating the above-described lubricant supply device to supply a predetermined amount of the lubricant, when a count of the above-described motor running counter has reached a predetermined upper limit; (d) to permit charging of the above-described electric-energy storage device with an electric energy supplied from an external electric power source provided outside the above-described hybrid vehicle, while the hybrid vehicle is held stationary; (e) and to operate the above-described engine for operating the above-described lubricant supply device to supply the above-described predetermined amount of the lubricant, during charging of the above-described electric-energy storage device by the above-described external electric power source, irrespective of whether the count of the above-described motor running counter has reached the above-described predetermined upper limit, and to reset the above-described motor running counter.

Advantages of the Invention

The hybrid vehicle control apparatus constructed according to the present invention described above is configured to forcibly operate the above-described engine for operating the above-described lubricant supply device to supply the above-described predetermined amount of the lubricant during the charging of the above-described electric-energy storage device by the above-described external electric power source, and to reset the above-described motor running counter, making it possible to reduce the frequency of operations of the engine which take place to operate the above-described lubricant supply device to supply the predetermined amount of the lubricant, each time the count of the motor running counter has reached the predetermined upper limit in the motor drive mode. Accordingly, the reduction of the stored electric energy amount of the electric-energy storage device can be minimized, permitting continuation of the motor drive mode for a longer length of time, resulting in prolonged motor running time and distance, for instance, and a consequent improvement of the fuel economy. Thus, it is possible to improve the fuel economy while permitting an adequate supply of the lubricant by the lubricant supply device to at least a portion of the power transmitting system. Additionally, it is possible to reduce the risk of giving the vehicle user a sense of anxiety which would be caused by the operation of the engine in the motor drive mode, which takes place irrespective of the vehicle running in the motor drive mode. Thus, the advantage of the motor drive mode of the plug-in hybrid vehicle is improved.

It is preferable that the hybrid vehicle is provided with a rotary drive device operatively connected to the above-described engine, and that the above-described engine is operated by the above-described rotary drive device. In this case, a forced operation of the engine without its starting or complete combustion can be adequately performed by operating the rotary drive device.

Preferably, the above-described power transmitting system is an electrically controlled differential portion which has a differential mechanism operatively connected to the above-described engine, and a differential electric motor operatively connected to the differential mechanism, and in which a differential state of the differential mechanism is controlled by controlling an operating state of the differential electric motor. In this case, the electric motor serving as the above-described vehicle drive power source is a vehicle driving electric motor operatively connected to the above-described drive wheel, and the differential electric motor is operated to operate the above-described engine. Thus, a forced operation of the engine without its starting or complete combustion can be adequately performed by operating the differential electric motor. In addition, the hybrid vehicle can be run in the motor drive mode adequately by using the vehicle driving electric motor.

Preferably, the above-described motor running counter is a motor running distance counter configured to count a distance of continuous running of the hybrid vehicle in the motor drive mode without an operation of the above-described engine. In this case, the lubricant supply device is operated to supply the lubricant at an adequate point of time in the motor drive mode.

Preferably, the above-described motor running counter is a motor running time counter configured to count a length of time of continuous running of the hybrid vehicle in the motor drive mode without an operation of the above-described engine. In this case, the lubricant supply device is operated to supply the lubricant at an adequate point of time in the motor drive mode.

Preferably, the above-described predetermined amount of the lubricant is supplied on the basis of the time of operation and the speed of operation of the above-described engine, and at least one of the time of operation and the speed of the operation is increased with a decrease of a temperature of the lubricant, so that the lubricant can be supplied adequately by the predetermined amount, irrespective of the temperature of the lubricant.

Preferably, a portion of the above-described power transmitting system is constituted by a differential mechanism having a first element connected to the above-described engine, a second element connected to a first electric motor, and a third element connected to an output rotary member and a second electric motor provided as the above-described electric motor. In this case, an output of the engine is distributed to the first electric motor and the above-described output rotary member. In the power transmitting system thus constructed, the differential mechanism functions as a transmission and permits the vehicle running in the motor drive mode, without a supply of a working oil (lubricant) for its shifting operation.

The above-described differential mechanism is preferably constituted by a planetary gear set having a carrier as the above-described first element, a sun gear as the above-described second element, and a ring gear as the above-described third element. In this case, the differential mechanism has a reduced axial dimension, and is simplified in construction being constituted by the single planetary gear set.

The above-described planetary gear set is preferably a planetary gear set of a single pinion type. In this case, the differential mechanism has a reduced axial dimension, and is simplified in construction being constituted by the single planetary gear set of the single pinion type.

The above-described second electric motor is preferably operatively connected directly to the above-described third element, or indirectly to the third element through a speed reducing device, for example, so that a drive force of the second electric motor is transmitted to the above-described output rotary member through the speed reducing device. In the latter case, the second electric motor can be small-sized.

MODE FOR CARRYING OUT THE INVENTION

An embodiment of the present invention will be described in detail by reference to the drawings.

Embodiment

Figure 1:
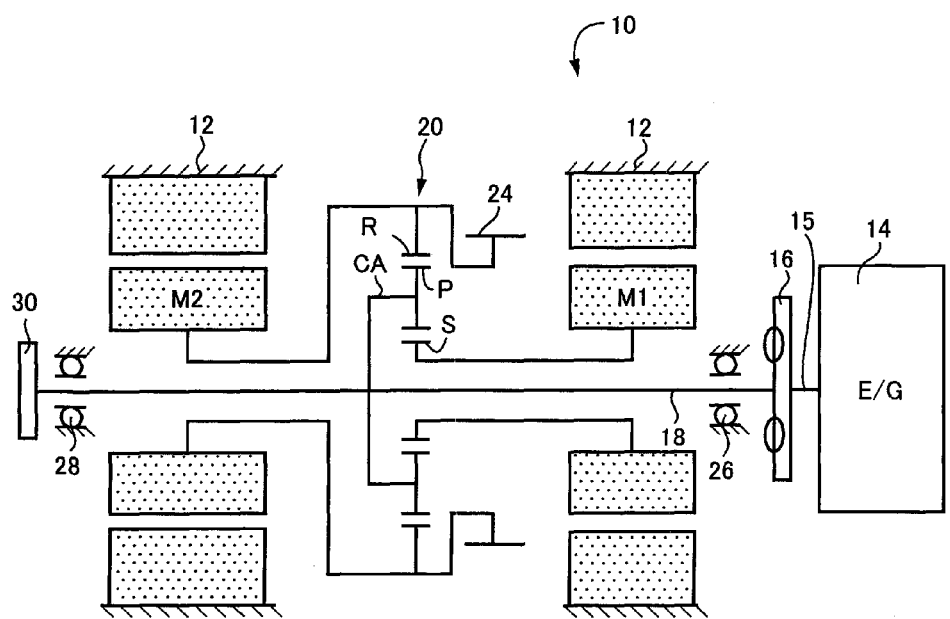
FIG. 1 is a schematic view for explaining an example of a transmission mechanism of a hybrid vehicle to which the present invention is applicable.

FIG. 1 is the schematic view for explaining a power transmitting system in the form of a transmission mechanism 10 of a hybrid vehicle 8 (shown in FIG. 5) to which the present invention is applicable. As shown in FIG. 1, the transmission mechanism 10 includes: a damper 16 which is operatively connected to an output shaft (e.g., crankshaft 15) of an internal combustion engine in the form of an engine 14 such as a gasoline engine or a diesel engine serving as a vehicle drive power source, and which is provided to absorb a pulsation due to a variation of a torque of the engine 14; an input shaft 18 rotated by the engine 14 through the damper 16; a first electric motor M1; a planetary gear set 20 functioning as a power distributing mechanism; and a second electric motor M2. The damper 16, input shaft 18, first electric motor M1, planetary gear set 20 and second electric motor M2 are disposed in the order of description from the side of the engine 14, within a transaxial (T/A) casing 12 (hereinafter referred to as "casing 12") serving as a stationary member attached to a body of the vehicle.

Figure 5:
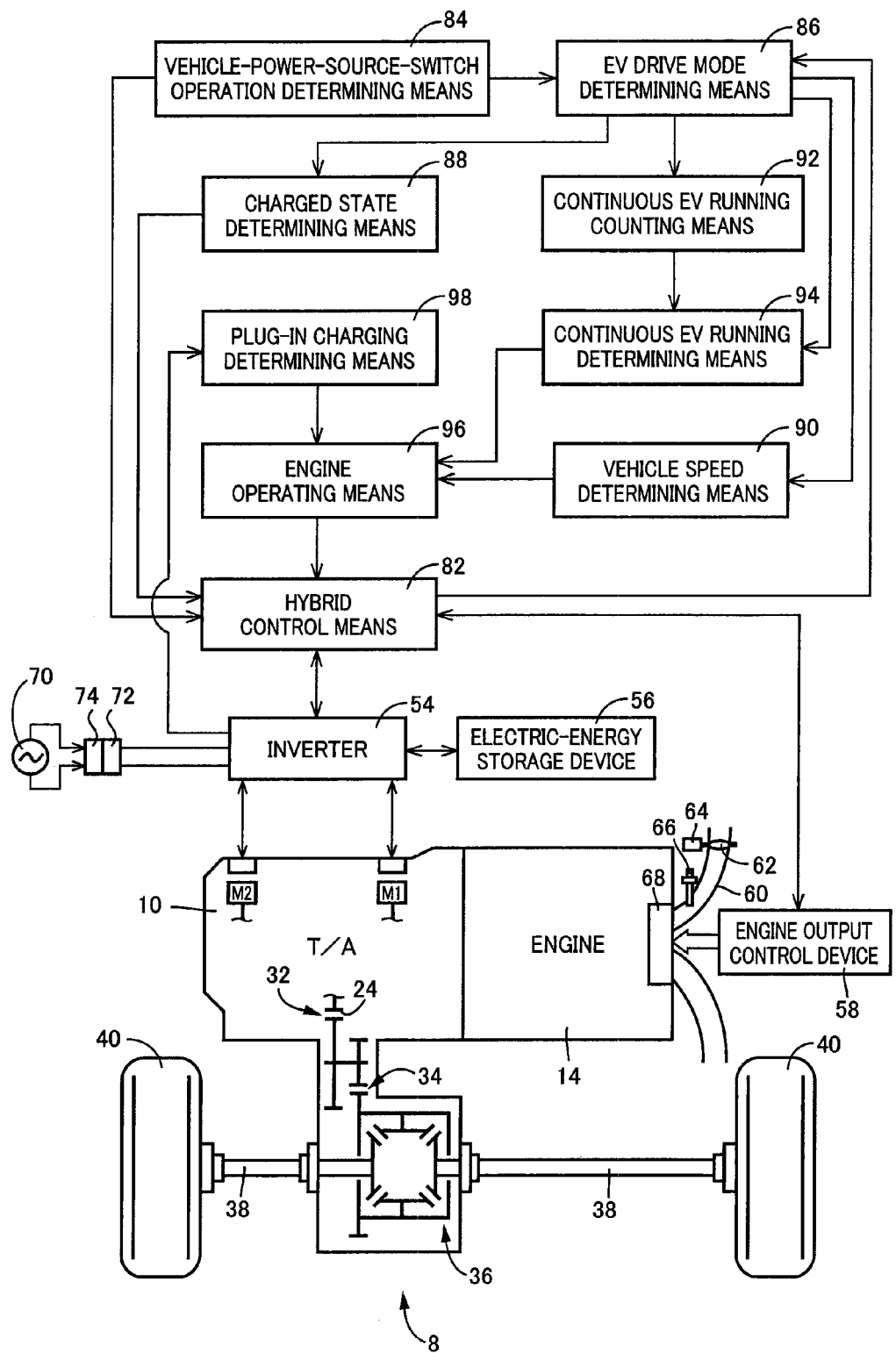
FIG. 5 is a functional block diagram illustrating major control functions of the electronic control device of FIG. 3.

This transmission mechanism 10 is suitably used for a transversal FF vehicle (front-engine, front-drive vehicle), for example, and is arranged to transmit a drive force of the engine 14 from an output rotary member of the transmission mechanism 10 in the form of an output gear 24 serving as one of a counter gear pair 32, to a pair of drive wheels 40 through the counter gear pair 32, a final gear pair 34, a differential gear device (final speed-reduction gear device) 36, a pair of axles 38, etc., which also constitute respective parts of the power transmitting system (as shown in FIG. 5).

The input shaft 18 is rotatably supported at its opposite ends by ball bearings 26 and 28, and is connected at one of its opposite end portions to the engine 14 through a dumper 16 so that the input shaft 18 is rotated by the engine 14. To the other end portion of the input shaft 18, there is connected a lubricant supply device in the form of an oil pump 30 so that the oil pump 30 is operated by a rotary motion of the input shaft 18, to supply a lubricant to predetermined parts of the transmission mechanism 10, such as the planetary gear set 20, ball bearings 26, 28, counter gear pair 32 and final gear pair 34.

The planetary gear set 20 is a planetary gear set of a single pinion type having a predetermined gear ratio $\rho 0$, and rotary elements (elements) consisting of: a sun gear S; a pinion gear P; a carrier CA supporting the pinion gear P such that the pinion gear P is rotatable about its axis and about the axis of the planetary gear set 20; and a ring gear R meshing with the sun gear S through the pinion gear P. Where the numbers of teeth of the sun gear S and the ring gear R are represented by ZS and ZR, respectively, the above-indicated gear ratio $\rho 0$ is represented by ZS/ZR. This planetary gear set 20 is a mechanism provided to mechanically distribute the output of the engine 14 received by the input shaft 18, to the first electric motor M1 and the output gear 24. Namely, the planetary gear set 20 is constructed such that the carrier CA is connected to the input shaft 18, that is, to the engine 14, and the sun gear S is connected to the first electric motor M1, while the ring gear R is connected to the output gear 24. The thus constructed planetary gear set 20 is placed in a differential state in which the three elements consisting of the sun gear S, carrier CA and ring gear R are rotatable relative to each other, so as to perform a differential function, so that the output of the engine 14 is distributed to the first electric motor M1 and the output gear 24, whereby a portion of the output of the engine 14 is used to drive the first electric motor M1 to generate an electric energy which is stored or used to drive the second electric motor M2. Accordingly, the transmission mechanism 10 is placed in a continuously-variable shifting state (electrically established CVT state), in which the transmission mechanism 10 is operated as an electrically controlled continuously variable transmission in which the rotating speed of the output gear 24 is continuously variable, irrespective of the operating speed of the engine 14.

Thus, the transmission mechanism 10 includes a differential mechanism in the form of the planetary gear set 20 operatively connected to the engine 14, and a differential electric motor in the form of the firs electric motor M1 operatively connected to the planetary gear set 20, and serves as an electrically controlled differential portion having the planetary gear set 20 a differential state of which is controlled by controlling an operating state of the first electric motor M1. The transmission mechanism 10 further includes the second electric motor M2, which is operatively connected to the output gear 24 so as to be rotated integrally with the output gear 24, and which functions as a vehicle drive power source. Namely, this second electric motor M2 serves as a vehicle drive electric motor operatively connected to the drive wheels 40. Each of the first and second electric motors M1 and M2 provided in this embodiment is a so-called motor/generator having also a function of an electric generator. The first electric motor M1 has at least a function of the electric generator for generating a reaction force, while the second electric motor M2 has at least a function of the electric motor operating as a vehicle drive power source for producing a vehicle drive force. The transmission mechanism 10 thus constructed serves as the power transmitting system the planetary gear set 20 of which functions as a transmission and permits the vehicle running in a motor drive mode, without a supply of a working oil (lubricant) to the planetary gear set for its shifting operation.

Figure 2:
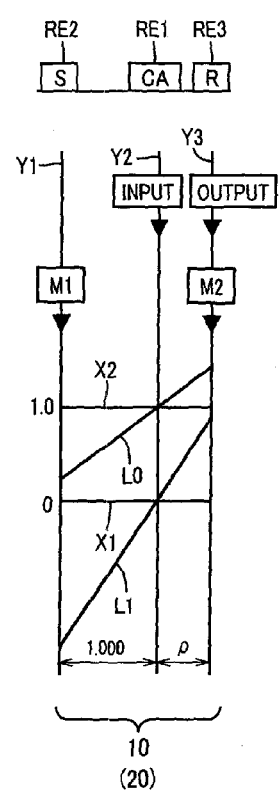
FIG. 2 is a collinear chart indicating, by straight lines, relative rotating speeds of rotary elements in the transmission mechanism of FIG. 1.

FIG. 2 is the collinear chart indicating, by straight lines, a relationship among the rotating speeds of the rotary elements of the transmission mechanism 10. The collinear chart of FIG. 2 is a rectangular two-dimensional coordinate system in which the gear ratios $\rho$ of the planetary gear set 20 is taken along the horizontal axis, while the relative rotating speeds of the rotary elements are taken along the vertical axis. A horizontal line X1 indicates the rotating speed of 0, while a horizontal line X2 indicates the rotating speed of 1.0, that is, an operating speed $N_E$ of the engine 14 connected operatively to the input shaft 18.

Three vertical lines Y1, Y2 and Y3 respectively corresponding to the three elements of the planetary gear set 20 of the transmission mechanism 10 respectively represent the relative rotating speeds of a second rotary element (second element) RE2 in the form of the sun gear S, a first rotary element (first element) RE1 in the form of the carrier CA, and a third rotary element (third element) RE3 in the form of the ring gear R. The distances between the adjacent ones of the vertical lines Y1, Y2 and Y3 are determined by the gear ratio $\rho$ of the planetary gear set 20. Described in detail, the distance between the vertical lines in the collinear chart representing the sun gear and carrier corresponds to "1", while the distances between the carrier and ring gear correspond to the gear ratio $\rho$ of the planetary gear set. That is, the transmission mechanism 10 is arranged such that the distance between the vertical lines Y1 and Y2 corresponds to "1", while the distance between the vertical lines Y2 and Y3 corresponds to the gear ratio ρ.

Referring to the collinear chart of FIG. 2, the transmission mechanism 10 in the present embodiment is arranged such that the first rotary element RE1 (carrier CA) of the planetary gear set 20 is integrally fixed to the input shaft 18, that is, to the engine 14, and the second rotary element RE2 is fixed to the first electric motor M1, while the third rotary element RE3 (ring gear R) is fixed to the output gear 24 and the second electric motor M2, so that a rotary motion of the input shaft 18 is transmitted to the drive wheels 40 through the output gear 24. A relationship between the rotating speeds of the sun gear S and the ring gear R is represented by an inclined straight line L0 which passes a point of intersection between the lines Y2 and X2. When the transmission mechanism 10 (planetary gear set 20) is placed in the differential state in which the first rotary element RE1 through the third rotary element RE3 are rotatable relative to each other, for instance, the rotating speed of the ring gear R represented by a point of intersection between the straight line L0 and the vertical line Y3 is held substantially constant at a value determined by a running speed V of the vehicle. In this differential state, the rotating speed of the carrier CA, i.e., the rotating speed Ne of the engine, represented by a point of intersection between the straight line L0 and the vertical line Y2 is raised or lowered, when the rotating speed of the sun gear S represented by a point of intersection between the straight line L0 and the vertical line Y1 is raised or lowered by controlling an operating speed $N_{M1}$ of the first electric motor M1.

Figure 3:
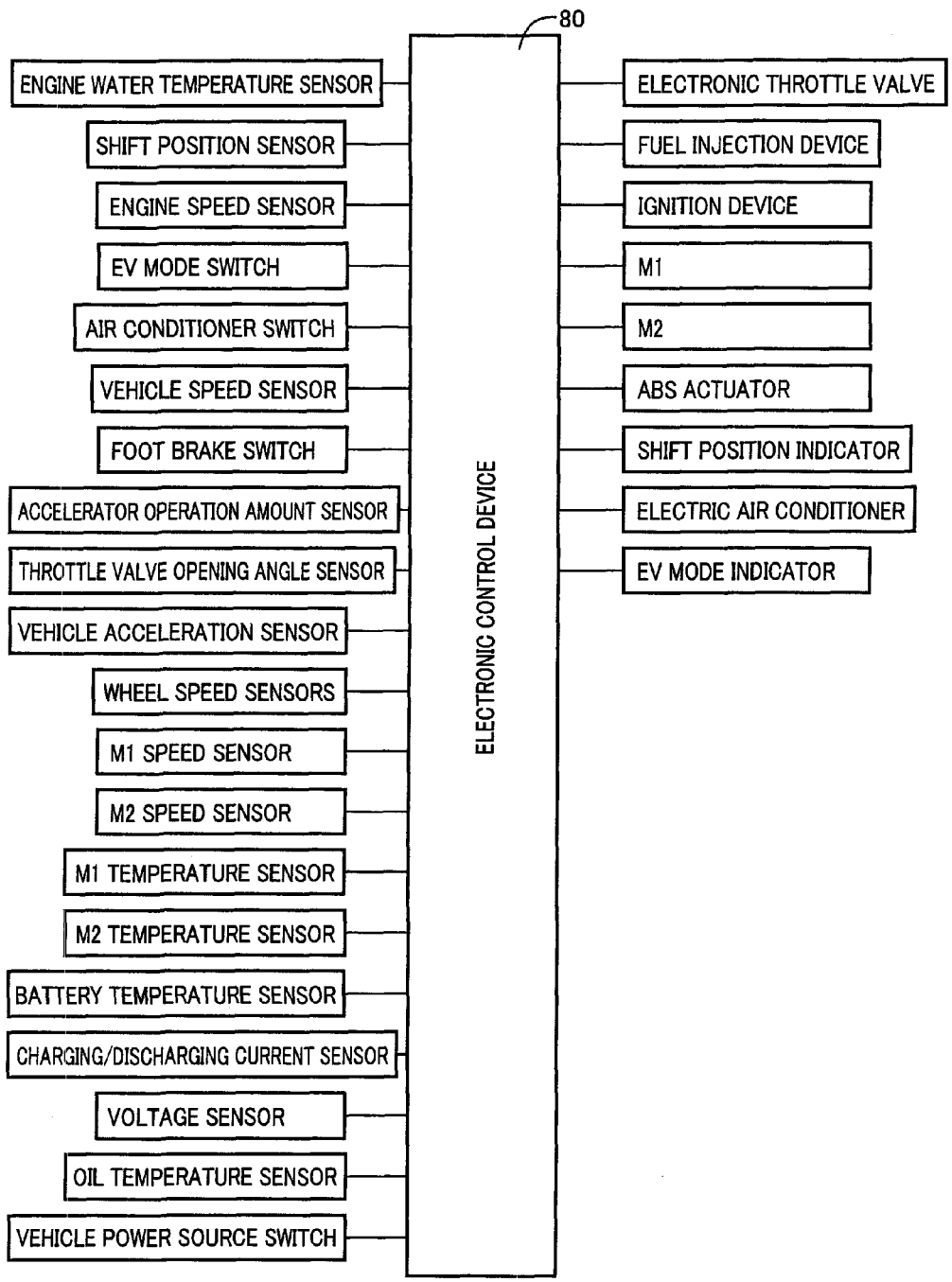
FIG. 3 is a view indicating input and output signals of an electronic control device provided to control the hybrid vehicle.

FIG. 3 is the view indicating signals for controlling the transmission mechanism 10 of the present invention received by and signals generated from an electronic control device 80. This electronic control device 80 is principally constituted by a so-called microcomputer which incorporates a CPU, a ROM, a RAM and an input/output interface. The electronic control device 80 is configured to process the signals according to programs stored in the ROM while utilizing a temporary data storage function of the RAM, to perform vehicle controls such as hybrid drive controls of the engine 14, first electric motor M1 and second electric motor M2.

The electronic control device 80 is arranged to receive from various sensors and switches shown in FIG. 3, various signals such as: a signal indicative of an engine water temperature $TH_w$; a signal indicative of a shift position $P_{SH}$ of a shift lever 52 (shown in FIG. 4); a signal indicative of the rotating speed $N_E$ of the engine 14; a signal indicative of an operating state of a switch provided to establish the motor drive mode (EV drive mode); a signal indicative of an operation of an air conditioner; a signal indicative of the vehicle running speed V corresponding to a rotating speed $N_{OUT}$ of the output gear 24 (output speed); a signal indicative of a temperature $TH_{OIL}$ of the lubricant; a signal indicative of an operation of a foot brake; a signal indicative of an operation amount $A_{CC}$ of an accelerator pedal corresponding to an operator's required output of the vehicle; a signal indicative of an opening angle $θ_{TH}$ of an electronic throttle valve; a signal indicative of a longitudinal acceleration value G of the vehicle; a signal indicative of a rotating speed of each vehicle wheel; a signal indicative of the operating speed $N_{M1}$ of the first electric motor M1 (hereinafter referred to as "first electric motor speed $N_{M1}$"); a signal indicative of an operating speed $N_{M2}$ of the second electric motor M2 (hereinafter referred to as "second electric motor speed $N_{M2}$"); a signal indicative of a temperature $TH_{M1}$ of the first electric motor M1 (hereinafter referred to as "first electric motor temperature"); a signal indicative of a temperature $TH_{M2}$ of the second electric motor M2 (hereinafter referred to as "second electric motor temperature"); a signal indicative of a temperature $TH_{BAT}$ of a electric energy storage device 56 (shown in FIG. 5) (hereinafter referred to as "battery temperature"); a signal indicative of a charging or discharging current $I_{CD}$ of the electric-energy storage device 56 (hereinafter referred to as "charging/discharging current" or "input/output current"); a signal indicative of a voltage $V_{BAT}$ of the electric-energy storage device 56; a signal indicative of the charged state (stored electric energy amount) SOC of the electric-energy storage device 56 calculated on the basis of the above-described battery temperature $TH_{BAT}$, charging/discharging current $I_{CD}$ and voltage $V_{BAT}$; and an output signal of a vehicle power switch operable by the vehicle user, which indicates a power on state (vehicle power ON or Ready-on state) or a power off state (vehicle power OFF or Ready-off state) of the vehicle.

The electronic control device 80 is further arranged to generate various control signals to be applied to an engine output control device 58 controlling an engine output (shown in FIG. 5), such as: a drive signal to drive a throttle actuator 64 for controlling the opening angle $θ_{TH}$ of the electronic throttle valve 62 disposed in an intake pipe 60 of the engine 14; a signal to control an amount of injection of a fuel by a fuel injecting device 66 into the intake pipe 60 or cylinders of the engine 14; a signal to be applied to an ignition device 68 to control the ignition timing of the engine 14; command signals to command the electric motors M1 and M2 to operate; a signal to operate an ABS actuator for anti-lock braking of the wheels; a signal to operate a shift-position indicator for indicating the selected shift position; a signal to operate the electric air conditioner; and a signal to operate an EV drive mode indicator for indicating the selection of the EV drive mode.

Figure 4:
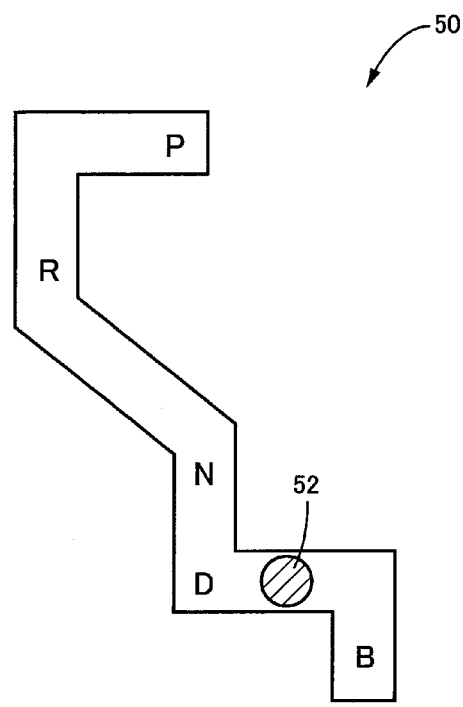
FIG. 4 is a view showing an example of a shifting device provided with a shift lever and manually operable to select one of a plurality of shift positions.

FIG. 4 shows an example of a manually operable shifting device in the form of a shifting device 50 for selecting one of a plurality of shift positions $P_{SH}$. The shifting device 50 includes a shift lever 52, which is disposed laterally adjacent to the operator's seat, for example, and which is manually operated to select one of the plurality of shift positions $P_{SH}$.

The shift lever 52 is manually operated to: a parking position P for placing the transmission mechanism 10 in a neutral state in which the power transmitting path is disconnected and in which the output gear 24 is locked; a reverse position R for driving the vehicle in the rearward direction; a neutral position N for placing the transmission mechanism 10 in the neutral state established by forcibly stopping the operations of the first and second electric motors M1 and M2 to zero the vehicle drive force at the output gear 24, for example; an automatic forward-drive shifting position D in which the transmission mechanism 10 is placed in an automatic shifting state in which a speed ratio γ0 is continuously variable over a predetermined range; and an engine braking position B in which a considerably large engine braking effect is obtained by a regenerative braking operation of the second electric motor M2 while the accelerator pedal is placed in the non-operated position.

Of the shift positions $P_{SH}$ consisting of the above-indicated positions P through B, the parking position P and the neutral position N are non-drive positions selected when the vehicle is not driven. These non-drive positions P, N are selected to switch the power transmitting path to a power cut-off state. The reverse-drive position R, and the automatic forward-drive position D are drive positions selected when the vehicle is driven. These drive positions R, D are selected to switch the power transmitting path to a power transmitting state.

The electric-energy storage device 56 shown in FIG. 5 is a chargeable and dischargeable DC power source, which is constituted by a secondary battery of a nickel hydrogen or lithium ion type, for example. When the vehicle is accelerated, for instance, an electric energy (electric power) generated by the first electric motor M1 operated to generate a reaction force with respect to the engine 14 is stored in the electric-energy storage device 56 through an inverter 54. When the vehicle is decelerated with a regenerative braking operation of the second electric motor M2, on the other hand, an electric power generated by the second electric motor M2 is stored in the electric-energy storage device 56 through the inverter 54. When the vehicle is run in the motor drive mode by the second electric motor M2, the electric power stored in the electric-energy storage device 56 is supplied through the inverter 54 to the second electric motor M2.

While the hybrid vehicle 8 is held stationary, the electric-energy storage device 56 can be charged with an electric power supplied from an external electric power source such as a commercial electric power source 70 provided outside the hybrid vehicle 8. For example, the hybrid vehicle 8 is provided with a connector 72 for connection with the commercial electric power source 70 to receive the electric power therefrom. When this connector 72 is connected to a connector 74 provided on the side of the commercial electric power source 70, the electric-energy storage device 56 is charged with the electric power supplied from the commercial electric power source 70 through the connector 72 and inverter 54, by voltage application from the commercial electric power source 70 to the connector 72.

FIG. 5 is the functional block diagram for explaining major control functions of the electronic control device 80. A hybrid control portion in the form of hybrid control means 82 shown in FIG. 5 is configured to control the engine 14 to be operated in an operating range of high efficiency, and to control the speed ratio γ0 of the transmission mechanism 10 operating as the electrically controlled continuously variable transmission, by optimizing a proportion of drive forces generated by the engine 14 and the second electric motor M2, and a reaction force generated by the first electric motor M1 during its operation as the electric generator. For instance, the hybrid control means 82 calculates a target (required) output of the vehicle at the present running speed V of the vehicle, on the basis of an operation amount $A_{CC}$ of the accelerator pedal used as an operator's required vehicle output, and the vehicle running speed V, and calculate a target total vehicle output on the basis of the calculated target output of the vehicle and a required amount of charging of the electric-energy storage device. Then, the hybrid control means 82 calculates a target engine output to obtain the calculated target total vehicle output, while taking account of a power transmission loss, a load acting on various optional devices of the vehicle, an assisting torque to be generated by the second electric motor M2, etc. The hybrid control means 82 controls the engine 14 and the amount of generation of the electric energy by the first electric motor M1, such that the rotating speed $N_E$ and torque $T_E$ of the engine 14 are controlled to obtain the calculated target engine output.

Namely, the hybrid control means 82 determines a target value of the speed ratio γ0 of the transmission mechanism 10 so that the engine 14 is operated such that an operating point of the engine 14 follows a stored well known highest-fuel-economy curve (fuel-economy map or relation), which is obtained by experimentation so as to satisfy both of the desired operating efficiency and the highest fuel economy of the engine 14 in the continuously-variable shifting state, and which is defined in a two-dimensional coordinate system defined by an axis of the engine rotating speed $N_E$ and an axis of the output torque $T_E$ of the engine 14 (engine torque $T_E$). For instance, the hybrid control means 82 determines the target value of speed ratio γ0 of the transmission mechanism 10 such that the engine torque $T_E$ and engine rotating speed $N_E$ are controlled to obtain the target engine output (target total vehicle output: required vehicle drive force), and controls the speed ratio y0 continuously within a predetermined range, to obtain the determined target value.

At the same time, the hybrid control means 82 controls an inverter 54 such that the electric energy generated by the first electric motor M1 is supplied to the electric-energy storage device 56 and the second electric motor M2 through the inverter 54. That is, a major portion of the drive force produced by the engine 14 is mechanically transmitted to the output gear 24, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the output gear 24. Thus, the devices relating to an operation from the generation of the electric energy to the consumption of the electric energy by the second electric motor M2 constitute an electric path through which the electric energy generated by conversion of a portion of the drive force of the engine 14 is converted into a mechanical energy.

The hybrid control means 82 is further configured to hold the engine speed $N_E$ substantially constant or at a desired value owing to an electric CVT function of the transmission mechanism 10, by controlling the first electric motor speed $N_{M1}$, for example, irrespective of whether the vehicle is stationary or running. That is, the hybrid control means 82 controls the first electric motor M1 so as to operate the engine 14, such that the first electric motor M1 operatively connected to the input shaft 18 (that is, the output shaft of the engine 14) through the planetary gear set 20 functions as a drive device operable to transmit a vehicle drive force to the input shaft 18. For example, the hybrid control means 82 is configured to raise the engine speed $N_E$ during running of the vehicle, by raising the first electric motor speed $N_{M1}$ while the output speed $N_{OUT}$ determined by the vehicle speed V (rotating speed of the drive wheels 40) is held substantially constant.

The hybrid control means 82 includes engine output control means functioning to command an engine output control device 58 to control the engine 14, so as to provide a required output, by controlling a throttle actuator 64 to open and close an electronic throttle valve 62, and controlling an amount and time of fuel injection by a fuel injection device 66, and/or the timing of ignition by an ignition device 68 such as ignitor, alone or in combination. For instance, the hybrid control means 82 is basically configured to control the throttle actuator 60 on the basis of the accelerator pedal operation amount $A_{CC}$ and according to a predetermined stored relationship (not shown) between the accelerator pedal operation amount $A_{CC}$ and the throttle vale opening angle $\theta_{TH}$, such that the opening angle $\theta_{TH}$ increases with an increase of the accelerator pedal operation amount $A_{CC}$. According to a command from the hybrid control means 82, the engine output control device 58 controls the engine torque by controlling the throttle actuator 64 to open and close the electronic throttle valve 62, and controlling the fuel ignition by the fuel injection device 66, and the ignition timing of the ignition device 68.

The hybrid control means 82 is further configured to establish a motor drive mode (EV drive mode) in which only the second electric motor M2 is operated as a vehicle drive power source, with an electric energy supplied from the electric-energy storage device 56, while the engine 14 is held at rest. For example, the EV drive mode is generally established by the hybrid control means 82, when a vehicle output torque $T_{OUT}$ is in a comparatively low range in which the engine efficiency is comparatively low, relative to when the vehicle output torque is in high range, namely, when the engine torque $T_E$ is in a comparatively low range, or when the vehicle speed V is in a comparatively low range, that is, when the vehicle load is comparatively low.

For preventing a dragging of the engine 14 in its non-operated state and improving the fuel economy in the EV drive mode, the hybrid control means 82 is configured to hold the engine speed $N_E$ at zero or substantially zero, as needed, owing to the electric CVT function (differential function) of the transmission mechanism 10, by placing the first electric motor M1 in its non-load or freely rotatable state, for example. Namely, the hybrid control means 82 not only holds the engine 14 in its non-operated state, but also prevents a rotary motion of the engine 14, in the EV drive mode.

The hybrid control means 82 also includes engine start control means functioning to start the engine 14 while the vehicle is stationary or running in the EV drive mode. For instance, the hybrid control means 82 commands the first electric motor M1 to raise the first electric motor speed $N_{M1}$, i.e., to operate as an engine starter, for raising the engine speed $N_E$ to a point higher than a predetermined value $N_E'$ at which complete combustion can take place, for example, to a point higher than an idling speed, at which the engine 14 can be kept operated by itself. After the engine speed $N_E$ has been raised to the above-indicated point, the hybrid control means 82 commands the fuel injection device 66 to supply the engine 14 with the fuel, and commands the ignition device 68 to start the engine 14.

The hybrid control means 82 is further configured to establish a so-called "torque assisting" mode in which the engine 14 operated as a vehicle drive power source in the engine drive mode is assisted by the second electric motor M2 operated to drive the drive wheels 40, with an electric energy supplied from the first electric motor M1 and/or the electric-energy storage device 56 through the electric path described above.

The hybrid control means 82 is further configured to place the first electric motor M1 in the non-load freely rotatable state, for thereby preventing power transmission through the transmission mechanism 10, that is, for establishing a state in which the power transmission path through the transmission mechanism 10 is disconnected, and to also place the second electric motor M2 in the non-load state to prevent the transmission mechanism 10 from providing an output. Namely, the hybrid control means 82 can place the transmission mechanism 10 in its neutral state by placing the electric motors M1, M2 in the non-load state.

In the EV drive mode in which only the second electric motor M2 is operated as the vehicle drive power source while the engine 14 is held at rest, the oil pump 30 is not operated, so that the lubricant is not supplied from the oil pump 30 to the predetermined parts of the transmission mechanism 10, such as the gears of the planetary gear set 20 and the ball bearings 26, 28. In the EV drive mode, therefore, a motor running counter is operated to count continuation of the motor drive mode in which the second electric motor M2 is operated while the engine 14 is held at rest, and a forced operation (motoring) of the engine 14 is performed by the first electric motor M1 to operate the oil pump 30 to supply a predetermined amount of the lubricant, when a count of the motor running counter has reached a predetermined upper limit.

The above-described motor running counter is a motor running distance counter configured to count a distance L of continuous running (EV running distance L) of the vehicle in the motor drive mode without an operation of the engine 14. That is, the count of the motor running counter represents the distance L of actual running of the vehicle in the EV drive mode established after the engine 14 is stopped. Alternatively, the above-described motor running counter is a motor running time counter configured to count a length of time T of continuous running (EV running time T) of the vehicle in the motor drive mode without the operation of the engine 14. That is, the count of the motor running counter represents the length of time T of actual running of the vehicle in the EV drive mode established after the engine 14 is stopped.

The above-described predetermined upper limit of the count is a threshold value predetermined by experimentation to determine whether the engine 14 should be operated by the first electric motor M1 to operate the oil pump 30 to supply the lubricant to the predetermined parts of the transmission mechanism 10, to prevent deterioration of durability of the predetermined parts due to metal contacts of the parts. Where the count represents the EV running distance L, for example, a predetermined upper limit (threshold value) Lα is used for the EV running distance L. Where the count represents the EV running time T, a predetermined upper limit (threshold value) Tα is used for the EV running time T.

The above-described predetermined amount of the lubricant is an amount of the lubricant predetermined by experimentation, which is sufficient to improve the durability of the predetermined parts of the transmission mechanism 10 by forming oil films on the metal contact surfaces. A supply of the thus predetermined amount of the lubricant is based on the time and speed of the forced operation of the engine 14 by the first electric motor M1, for example. Namely, the time and speed of the forced operation of the engine 14 by the first electric motor M1 required to supply the predetermined amount of the lubricant are predetermined on the basis of an amount of delivery of the lubricant by the oil pump 30, which is determined by the capacity of the oil pump 30, the operating time of the oil pump 30 and the operating speed of the oil pump 30. The rate of flow of the lubricant decreases with a decrease of the temperature $TH_{OIL}$ of the lubricant. In this respect, it is desirable to increase the time and/or speed of the forced operation of the engine 14 with a decrease of the temperature $TH_{OIL}$ of the lubricant so as to ensure the predetermined amount of the lubricant.

The forced operation of the engine 14 by the first electric motor M1 to operate the oil pump 30 to lubricate the predetermined parts of the transmission mechanism 10 during EV running results in deterioration of the charged state SOC of the electric-energy storage device 56 from which the electric energy is supplied to the first electric motor M1. Accordingly, the maximum EV running distance and time are reduced, and the engine 14 should be operated (started) at an earlier point of time, giving rise of a risk of reduction of the energy efficiency of the vehicle, for instance, reduction of the fuel economy of the vehicle. From another point of view, the forced operation of the engine 14 in the EV drive mode means an operation of the engine irrespective of the vehicle running by the electric motor, giving rise to a risk of giving the user of the vehicle a sense of anxiety. In this respect, it is particularly noted that the hybrid vehicle 8 according to the present embodiment is a so-called "plug-in hybrid vehicle" in which the electric-energy storage device 56 is chargeable with an electric energy supplied from the commercial electric power source 70, and which permits comparatively long running time and distance in the EV drive mode. However, the forced operation of the engine 14 by the first electric motor M1 during EV running if performed frequently may reduce advantages of the plug-in hybrid vehicle in the EV running mode, such as an improvement of the fuel economy.

In view of the above, the present embodiment is configured such that the forced operation of the engine 14 by the first electric motor M1 to operate the oil pump 30 to supply the above-descried predetermined amount of the lubricant is performed during charging of the electric-energy storage device 56 by the commercial electric power source 70 (namely, during a plug-in charging of the electric-energy storage device 56), irrespective of whether the count of the above-described motor running counter (representing the EV running distance L or EV running time T) has reached the predetermined upper limit (EV running distance upper limit Lα or EV running time upper limit Tα), and the motor running counter is reset, in order to reduce the frequency of the forced operation of the engine 14 by the first electric motor M1 in the EV drive mode.

Described in detail, a vehicle-power-source-switch operation determining portion in the form of vehicle-power-source-switch determining means 84 is provided to determine whether a vehicle power source switch has been operated by the user to a Ready-on state, for instance, to start running of the vehicle in a power-off state. For example, this determination is made by determining whether an output signal of a power switch has been received during an operation of a brake pedal after a power-on operation, for example, inserting a key into a key slot. The vehicle-power-source-switch determining means 84 also determines whether the vehicle power source switch has been operated by the user to a Ready-off state, for instance, to terminate running of the vehicle in a power-on state. For example, this determination is made by determining whether an output signal of the power switch has been received while the vehicle running speed V is lower than a threshold value V'. This threshold value V' is predetermined by experimentation and stored in memory for determining whether the vehicle is stationary. The above-described power-on state of the vehicle is a state which is established by starting a hybrid system for permitting running of the vehicle and in which the vehicle running is controlled by hybrid control commands associated with the vehicle running. The operation to start the vehicle running is performed to start the control devices and to implement a system check (including an abnormality check relating to the hybrid control) of the control devices for placing the vehicle in a drivable state (in the Read-on state), and should be distinguished from an operation to start the vehicle when the vehicle is stopped at a stop signal on a roadway. The above-described power-off state of the vehicle is a state in which the hybrid system cannot be started to permit starting of the vehicle running, but it is possible to detect connection of the connector 74 for plug-in charging of the electric-energy storage device 56 by the commercial electric power source 70, and to monitor and control the plug-in charging.

An EV drive mode determining portion in the form of EV drive mode determining means 86 is provided to determine whether the present state of the vehicle requires the vehicle to be placed in the EV drive mode. This determination is made by determining whether the hybrid control means 82 has determined that the EV drive mode should be established, or whether the EV drive mode is actually established. Thus, the EV drive mode determining means 86 determines that the vehicle is placed in the EV drive mode, if the vehicle is placed in a state in which the EV drive mode should be established, irrespective of whether the EV drive mode is actually established.

A charged state determining portion in the form of charged state determining means 88 is provided to determine whether an actual electric energy amount P representative of the charged state SOC of the electric-energy storage device 56 is equal to or smaller than a predetermined threshold Pα. This threshold Pα is a charging start threshold predetermined by experimentation to determine whether the electric-energy storage device 56 should be charged by the first electric motor M1 operated as the electric generator by the engine 14 when the charged state SOC of the electric-energy storage device 56 is not sufficient during the vehicle running in the EV drive mode, for instance.

When the charged state determining means 88 has determined that the actual electric energy amount P representative of the charged state SOC of the electric-energy storage device 56 is equal to or smaller than the predetermined threshold Pα, the hybrid control means 82 energies the first electric motor M1 in the EV drive mode to raise the first electric motor speed $N_{M1}$ for raising the engine speed $N_E$ to a level not lower than a predetermined level $N_E'$ at which complete combustion is possible. At the same time, the hybrid control means 82 commands the fuel injection device 66 to inject a fuel into the engine 14, and commands the ignition device 68 to ignite the engine 14, for thereby starting the engine 14. After the engine 14 has been started, the hybrid control means 82 resets the above-described motor running counter (to reset the counted EV running distance L or EV running time T) to its initial state.

A vehicle speed determining portion in the form of vehicle speed determining means 90 is provided to determine whether the actual vehicle running speed V is equal to or higher than a predetermined value Vα. When the vehicle running speed V (operating speed $N_{M2}$ of the second electric motor M2) is raised in the EV drive mode, the first electric motor M1, pinion gear P, and bearings and other parts within the transmission mechanism 10, for example, are operated or rotated at comparatively high speeds, as indicated by the straight line L1 in FIG. 2, so that their durability may be reduced. To prevent excessive rotating speeds of those pinion gear P, bearings and other parts, it is necessary to raise the operating speed of the first electric motor M1, that is, to cause a forced operation of the engine 14 by the first electric motor M1. The predetermined value Vα indicated above is a threshold value obtained by experimentation to determine whether the first electric motor M1 is operated to cause the forced operation of the engine 14 to protect the above-described parts.

A continuous EV running counting portion in the form of continuous EV running counting means 92 is provided to operate the motor running counter to count the continuation of the motor drive mode in which the second electric motor M2 is operated while the engine 14 is held at rest during EV mode, for example. For example, the continuous EV running counting means 92 is configured to count the actual EV running distance L of the vehicle after the forced operation of the engine 14 is stopped as an EV running distance count L. Alternatively, the continuous EV running counting means 92 is configured to count the actual EV running time T after the forced operation of the engine 14 is stopped as an EV running time count T.

A continuous EV running determining portion in the form of continuous EV running determining means 94 is provided to determine whether the count of the motor running counter operated by the continuous EV running counting means 92 is equal to or higher than the predetermined upper limit. For example, the continuous EV running determining means 94 is configured to determine whether the EV running distance L counted under the control of the continuous EV running counting means 92 is equal to or longer than the predetermined threshold value Lα. Alternatively, the continuous EV running determining means 94 is configured to determine whether the EV running time T counted under the control of the continuous EV running counting means 92 is equal to or longer than the predetermined threshold value Tα.

An engine operating portion in the form of engine operating means 96 is provided to apply an engine operating command to the hybrid control means 82 to cause the forced operation of the engine 14 by the first electric motor M1, for operating the oil pump 30 to supply the predetermined amount of the lubricant, when the vehicle speed determining means 90 has determined that the actual vehicle running speed V is equal to or higher than the predetermined value Vα, or when the continuous EV running determining means 94 has determined that the EV running distance L is equal to or longer than the predetermined threshold value Lα, or that the EV running time T is equal to or longer than the predetermined threshold value Tα. According to the above-described engine operating command, the hybrid control means 82 energizes the first electric motor M1 to raise its operating speed $N_{M1}$, to cause the forced operation of the engine 14 at a suitable speed and for a suitable length of time, which suitable speed and length of time are predetermined by experimentation so that the predetermined amount of the lubricant is supplied. These speed (rpm) and length of time (sec) of the forced operation of the engine 14 are obtained by experimentation so that the oil pump 30 is operated by the forced operation of the engine 14 to supply the predetermined amount of the lubricant to all of the predetermined parts of the transmission mechanism 10. For instance, the predetermined speed of the forced operation of the engine 14 is predetermined to be equal to the idling speed, and the predetermined length of time of the forced operation is predetermined to be selected within a range from several seconds to several tens of seconds. After the forced operation of the engine 14 by the first electric motor M1 is performed, the hybrid control means 82 resets the above-described motor running counter (resets the counted EV running distance L or EV running time T) to its initial state.

A plug-in charging determining portion in the form of plug-in charging determining means 98 is provided to determine whether the electric-energy storage device 56 is in the process of being charged by the commercial electric power source 70 (in a plug-in charging state). For instance, the plug-in charging determining means 98 is configured to determine whether the electric-energy storage device 56 is being charged with an electric energy supplied from the commercial electric power source 70 through the inverter 54, with the connector 74 of the commercial electric power source 70 being connected to the connector 72 to apply a voltage of the commercial electric power source 70 to the connector 72.

When the plug-in charging determining means 98 has determined that the electric-energy storage device 56 is in the process of being charged by the commercial electric power source 70, the engine operating means 96 applies the engine operating command to the hybrid control means 82 for operating the oil pump 30 to supply the predetermined amount of the lubricant, as well as when the engine operating command is applied to the hybrid control means 82 according to the affirmative determinations by the vehicle speed determining means 90 and the continuous EV running determining means 94. The hybrid control means 82 operates to rotate engine 14 using the first electric motor M1 in accordance with the engine operating command. After rotating engine 14, the hybrid control means 82 resets a value (count) of the motor running counter.

Figure 6:
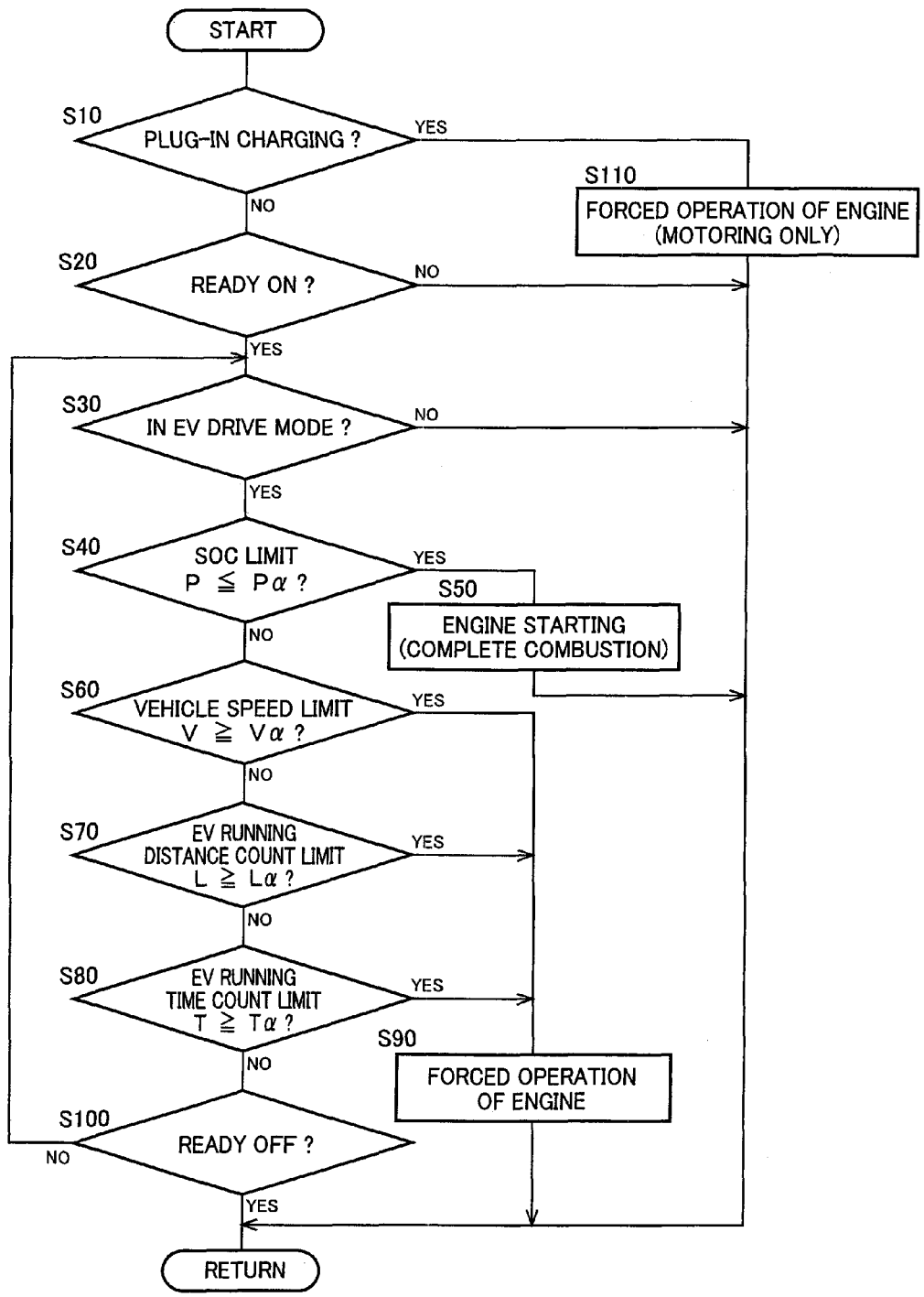
FIG. 6 is a flow chart illustrating a control operation of the electronic control device of FIG. 3, namely, a control operation for improving a fuel economy while a lubricant is adequately supplied from an oil pump to predetermined parts of the transmission mechanism.

FIG. 6 is the flow chart illustrating a major control operation of the electric control device 80, namely, a control operation performed to improve the fuel economy while permitting the oil pump 30 to supply the predetermined amount of the lubricant to the predetermined parts of the transmission mechanism 10. This control operation is repeatedly performed with an extremely short cycle time of about several milliseconds to about several tens of milliseconds.

Initially, step (hereinafter "step" being omitted) S10 in FIG. 6 corresponding to the plug-in charging determining means 98 is implemented to determine whether the electric-energy storage device 56 is in the process of being charged by the commercial electric power source 70. When the electric-energy storage device 56 is not in the plug-in charging state, a negative determination is obtained in S10, and the control flow goes to S20 corresponding to the vehicle-power-source-switch operation determining means 84, to determine whether the vehicle power source switch has been operated by the user to the Ready-on state, for instance, to start running of the vehicle in the power-off state. When a negative determination is obtained in S20, the present control routine is terminated. When an affirmative determination is obtained in S20, the control flow goes to S30 corresponding to the EV drive mode determining means 86, to determine whether the vehicle is presently placed in the EV drive mode. When a negative determination is obtained in S30, the present control routine is terminated. When an affirmative determination is obtained in S30, the control flow goes to S40 corresponding to the charged state determining means 88, to determine whether the actual electric energy amount P representative of the charged state SOC of the electric-energy storage device 56 is equal to or smaller than the predetermined threshold Pα. When the electric energy amount P is equal to or smaller than the predetermined threshold Pα, an affirmative determination is obtained in S40, the control flow goes to S50 corresponding to the hybrid control means 82, to operate the first electric motor M1 to raise the engine speed $N_E$ to the level not lower than the predetermined level $N_E'$ at which complete combustion is possible. At the same time, the fuel injection device 66 is operated to inject the fuel into the engine 14, and the ignition device 68 is operated to ignite the engine 14, for thereby starting the engine 14. After the engine 14 has been started, the counted EV running distance L and EV running time T are reset.

When a negative determination is obtained in S40, the control flow goes to S60 corresponding to the vehicle speed determining means 90, to determine whether the actual vehicle running speed V is equal to or higher than the predetermined value Vα. When the actual vehicle running speed V is not equal to or higher than the predetermined value Vα, a negative determination is obtained in S60, and the control flow goes to S70 corresponding to the continuous EV running determining means 94, to determine whether the EV running distance L counted under the control of the continuous EV running counting means 92 is equal to or longer than the predetermined threshold value Lα. When the EV running distance L is not equal to or longer than the predetermined threshold value Lα, i.e., the determination in S70 is negative, the control flow goes to S80 also corresponding to the continuous EV running determining means 94, to determine whether the EV running time T counted under the control of the continuous EV running counting means 92 is equal to or longer than the predetermined threshold value Tα. When an affirmative determination is obtained in any one of the above-described S60, S70 and S80, the control flow goes to S90 corresponding to the engine operating means 96 and the hybrid control means 82, to generate the engine operating command for causing the forced operation of the engine 14 by the first electric motor M1 to operate the oil pump 30 to supply the predetermined amount of the lubricant, so that the first electric motor M1 is energized according to the engine operating command, to raise the first electric motor speed $N_{M1}$, for forcibly operating the engine 14 for the predetermined length of time and at the predetermined speed. After the forced operation of the engine 14 by the first electric motor M1 is performed, the counted EV running distance L and the counted EV running time T are reset.

When the EV running time T is not equal to or longer than the predetermined threshold value Tα, a negative determination is obtained in S80, and the control flow goes to S100 corresponding to the vehicle-power-source-switch operation determining means 84, to determine whether the vehicle power source switch has been operated by the user to the Ready-off state, for instance, to terminate running of the vehicle in the power-on state. When a negative determination is obtained in S100, the above-described step S30 and subsequent steps are repeatedly implemented. When an affirmative determination is obtained in S100, the present control routine is terminated. When an affirmative determination is obtained in S10 in the plug-in charging state, on the other hand, the control flow goes to S110 corresponding to the engine operating means 96 and the hybrid control means 82, to generate the engine operating command for operating the oil pump 30 to supply the predetermined amount of the lubricant, as in S90 described above, so that the engine 14 is forcibly operated by the first electric motor M1 according to the engine operating command, and the counted EV running distance L and the counted EV running time T are reset after the forced operation of the engine 14 by the first electric motor M1.

In the embodiment descried above, the engine 14 is forcibly operated by the first electric motor M1 for operating the oil pump 30 to supply the predetermined amount of the lubricant during the plug-in charging of the electric-energy storage device 56 by the commercial electric power source 70, and the above-described motor running counter (counting the EV running distance L and the EV running time T) is reset, making it possible to reduce the frequency of operations of the engine 14 which take place to operate the oil pump 30 to supply the predetermined amount of the lubricant, each time the count of the motor running counter has reached the predetermined upper limit in the EV drive mode. Accordingly, the reduction of the stored electric energy amount SOC of the electric-energy storage device 56 during EV running can be minimized, permitting continuation of the EV drive mode for a longer length of time, resulting in prolonged EV running time and distance, for instance, and a consequent improvement of the fuel economy. Thus, it is possible to improve the fuel economy while permitting an adequate supply of the lubricant to the predetermined parts of the transmission mechanism 10 using oil pump 30. Additionally, it is possible to reduce the risk of giving the vehicle user a sense of anxiety which would be caused by the forced operation of the engine 14 in the EV drive mode, which takes place irrespective of the vehicle running in the EV drive mode. Thus, the advantage of the EV drive mode of the plug-in hybrid vehicle is improved.

The present embodiment is further arranged such that the engine 14 is forcibly operated by the first electric motor M1 operatively connected to the engine. Thus, the forced operation of the engine 14 without its starting or complete combustion can be adequately performed by operating the first electric motor M1.

In the present embodiment, the transmission mechanism 10 is an electrically controlled differential portion which has the planetary gear set 20 operatively connected to the engine 14, and the first electric motor M1 operatively connected to the planetary gear set 20, and in which the differential state of the planetary gear set 20 is controlled by controlling the operating state of the first electric motor M1. The second electric motor M2 which cooperates with the engine 14 to serve as the vehicle drive power source is operatively connected to the drive wheels 40, and the first electric motor M1 is operated to forcibly operate the engine 14, so that the forced operation of the engine 14 without its starting or complete combustion can be adequately performed by operating the first electric motor M1. In addition, the hybrid vehicle can be run in the EV drive mode by using the second electric motor M2 adequately.

The present embodiment is further arranged such that the above-described motor running counter is the motor running distance counter configured to count the distance L of continuous running of the hybrid vehicle in the EV drive mode without an operation of the engine 14, so that the oil pump 30 is operated to supply the lubricant at an adequate point of time in the EV drive mode.

The present embodiment is also arranged such that the above-described motor running counter is the motor running time counter configured to count the length of time T of continuous running of the hybrid vehicle in the EV drive mode without an operation of the engine 14, so that the oil pump 30 is operated to supply the lubricant at an adequate point of time in the EV drive mode.

The present embodiment is further arranged such that the above-described predetermined amount of the lubricant is supplied on the basis of the time of operation and the speed of operation of the engine 14, and at least one of the time of operation and the speed of the operation is increased with a decrease of the temperature $TH_{OIL}$, of the lubricant, so that the lubricant can be supplied adequately by the predetermined amount, irrespective of the temperature $TH_{OIL}$ of the lubricant.

While the embodiment of this invention has been described hi detail by reference to the drawings, it is to be understood that the present invention may be otherwise embodied.

In the illustrated embodiment, the motor running counter is operated to count the EV running distance L or EV running time T, and the continuous EV running determining means 94 (S70 and S80 in FIG. 6 determines whether the counted EV running distance L is equal to or longer than the predetermined threshold value Lα, and whether the counted EV running time T is equal to or longer than the predetermined threshold value Tα. However, at least one of the EV running distance L and the EV running time T may be counted by the EV running counter for determining whether the count of the motor running counter is equal to or higher than the predetermined upper limit, according to the principle of the present invention. Even in such a case, effect of the present invention is obtained to a certain extent.

In the illustrated embodiment, the determination is made in S100 of the flow chart of FIG. 6 as to whether the operation to place the vehicle in the Ready-off state is performed in the power-on state, and one cycle of execution of the control routine is terminated, when the affirmative determination is obtained in S100, so that S10 of the flow chart is implemented again in the next cycle of execution of the control routine. Namely, the determination as to whether the plug-in charging is performed is made in the Ready-off state, since the vehicle is configured such that the plug-in charging is performed in the Ready-off state. However, the vehicle need not be configured such that the plug-in charging is performed in the Ready-off state. That is, the provision of S100 is not essential.

Although the engine operating command is generated in S90 of the flow chart of FIG. 6 in the illustrated embodiment to forcibly operate the engine 14 by the first electric motor M1, the engine 14 may be started for operation by itself, according to the engine operating command. In this case, the hybrid control means 82 starts the engine 14 according to the engine operating command. In S110, however, the operation of the engine 14 is limited to the forced operation by the first electric motor M1, without starting of the engine 14 (namely, limited to the motoring by the first electric motor M1).

In the illustrated embodiment, the transmission mechanism 10 is provided as the power transmitting system. However, the present invention is applicable to any other power transmitting system which permits running of the vehicle in the EV drive mode, without a supply of the working fluid. For example, the present invention is applicable to a power transmitting system provided with a manual transmission well known in the art, and an engine and an electric motor which serve as a vehicle drive power source.

In the illustrated embodiment, the transmission mechanism 10 is provided with the differential mechanism in the form of the planetary gear set 20. However, this planetary gear set 20 may be replaced by a differential mechanism in the form of a differential gear device having a pinion rotated by the engine 14, and a pair of bevel gears which mesh with the pinion and which are operatively connected to the first electric motor M1 and the output gear 24, for instance.

In the illustrated embodiment, the oil pump 30 is provided as the lubricant supply device such that the oil pump 30 is coaxially connected to the crankshaft 15 of the engine 14 through the input shaft 18 and the damper 16. However, the oil pump 30 may be replaced by any other lubricant supply device which is operated by the engine 14 to permit a supply of the lubricant to the predetermined parts of the transmission mechanism 10. For instance, the lubricant supply device may be an oil pump operatively connected to the engine 14 through a belt or gears.

In the illustrated embodiment, the first electric motor M1 operatively connected to the engine 14 through the planetary gear set 20 is provided as a rotary drive device operatively connected to the engine 14. However, the first electric motor M1 may be replaced by any other rotary drive device which permits a forced operation of the engine 14. For example, the rotary drive device may be an electric motor (an engine starting device or starter well known in the art) operatively connected to the engine 14 either directly or through a belt or gears.

In the illustrated embodiment, the plug-in charging of the electric-energy storage device 56 is performed with an electric energy supplied from the commercial electric power source 70 through the inverter 54. However, the plug-in charging may be performed in any other manner. For instance, the plug-in charging of the electric-energy storage device 56 may be performed with the electric energy supplied from the commercial electric power source 70 through a charging device or an external charging device exclusively provided on the vehicle, rather than the inverter 54.

While the embodiment has been described for illustrative purpose only, the present invention may be embodied with various changes and improvements which may occur to those skilled in the art.

NOMENCLATURE OF REFERENCE SIGNS

8: Hybrid vehicle
10: Transmission mechanism (Power transmitting system, Electrically controlled differential portion)
14: Engine (Vehicle drive power source)
20: Planetary gear set (Differential mechanism)
30: Oil pump (Lubricant supply device)
40: Drive wheels
56: Electric-energy storage device
70: Commercial power source (External electric power source)
80: Electronic control device (Control apparatus)
M1: First electric motor (Rotary drive device, Differential electric motor)
M2: Second electric motor (Vehicle drive power source, Vehicle drive electric motor)

The invention claimed is:

1. A control apparatus for a hybrid vehicle provided with an engine and an electric motor serving as a vehicle drive power source, a power transmitting system for transmitting a drive force of said vehicle drive power source to a drive wheel, an electric-energy storage device for storing an electric energy to be supplied to said electric motor, and a lubricant supply device which is operatively connected to said engine and operated by a rotary motion of the engine to supply a lubricant to at least a portion of said power transmitting system, the control apparatus being configured:
   to permit running of the hybrid vehicle in a motor drive mode in which only said electric motor is operated as the vehicle drive power source, with the electric energy supplied from said electric-energy storage device while the rotary motion of said engine is stopped;
   to operate a motor running counter in said motor drive mode, to count continuation of said motor drive mode without the rotary motion of said engine, and to operate said engine for operating said lubricant supply device to supply a predetermined amount of the lubricant, when a count of said motor running counter has reached a predetermined upper limit;
   to permit charging of said electric-energy storage device with an electric energy supplied from an external electric power source provided outside said hybrid vehicle, while said hybrid vehicle is held stationary; and
   to operate said engine for operating said lubricant supply device to supply said predetermined amount of the lubricant, during charging of said electric-energy storage device by said external electric power source, irrespective of whether the count of said motor running counter has reached said predetermined upper limit, and to reset said motor running counter.

2. The control apparatus according to claim 1, wherein the hybrid vehicle is provided with a rotary drive device operatively connected to said engine, the control apparatus being configured to forcibly operate said engine by said rotary drive device during the charging of said electric-energy storage device by said external electric power source.

3. The control apparatus according to claim 1, wherein said power transmitting system is an electrically controlled differential portion having a differential mechanism operatively connected to said engine, and a differential electric motor operatively connected to said differential mechanism, and wherein a differential state of said differential mechanism is controlled by controlling an operating state of said differential electric motor,
   wherein the electric motor serving as a vehicle drive power source is a drive motor connected to the drive wheel in a power transmissive manner and
   wherein said engine is operated by said differential electric motor.

4. The control apparatus according to claim 1, wherein said motor running counter is a motor running distance counter configured to count a distance of continuous running of the hybrid vehicle in said motor drive mode without an operation of said engine.

5. The control apparatus according to claim 1, wherein said motor running counter is a motor running time counter configured to count a length of time of continuous running of the hybrid vehicle in said motor drive mode without an operation of said engine.

6. The control apparatus according to claim 1, wherein said predetermined amount of the lubricant is supplied on the basis of a time of operation and a speed of operation of said engine, the control apparatus being configured to increase at least one of said time of operation and said speed of the operation with a decrease of a temperature of said lubricant.

* * * * *